United States Patent Office
3,600,463
Patented Aug. 17, 1971

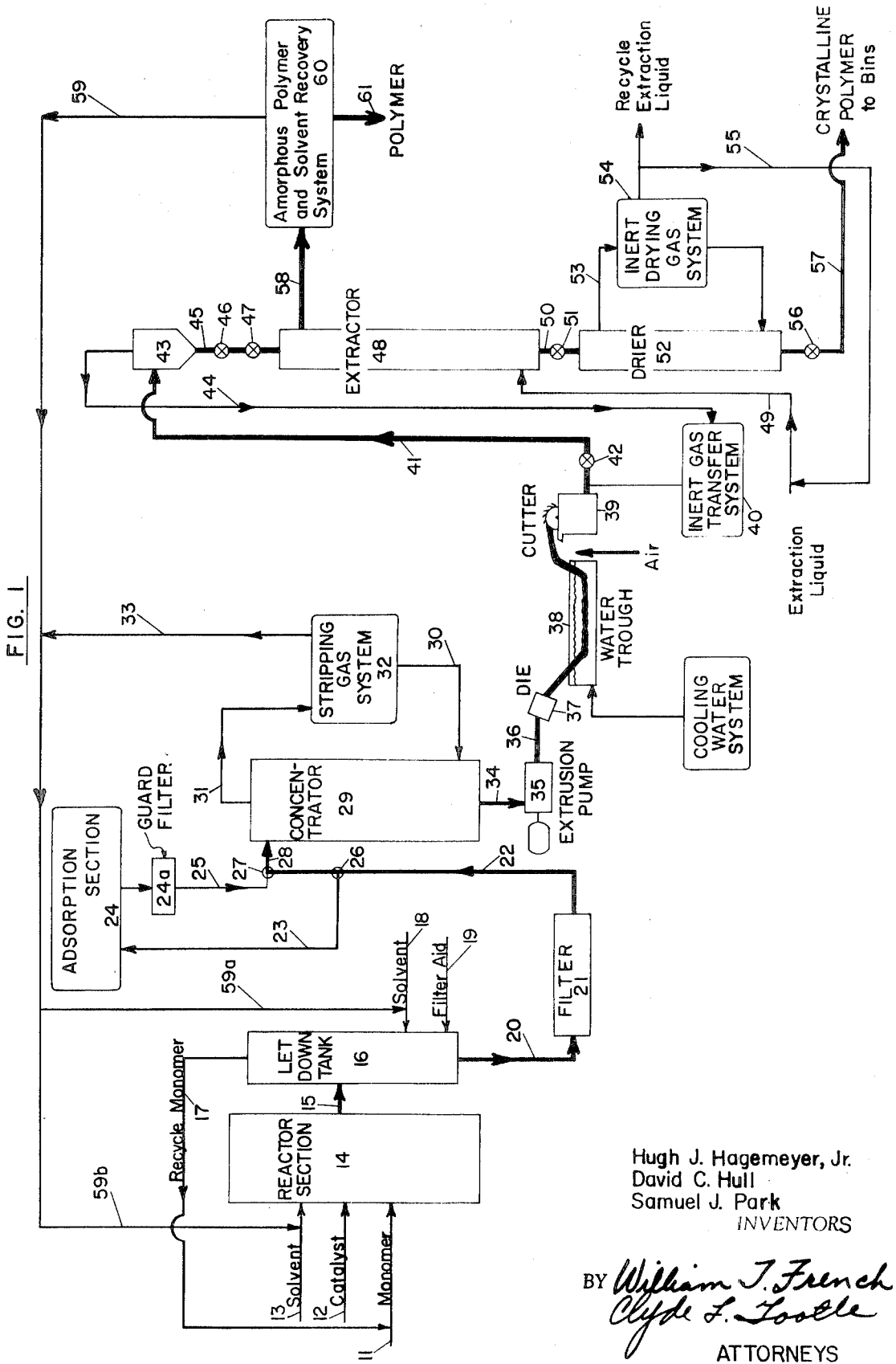

3,600,463
PROCESS FOR PRODUCING SUBSTANTIALLY ASH-FREE POLYOLEFIN POLYMERS
Hugh J. Hagemeyer, Jr., David C. Hull, and Samuel J. Park, Longview, Tex., assignors to Eastman Kodak Company, Rochester, N.Y.
Continuation-in-part of application Ser. No. 636,118, May 4, 1967. This application Dec. 18, 1967, Ser. No. 695,820
Int. Cl. C08f 47/00
U.S. Cl. 260—878B
11 Claims

ABSTRACT OF THE DISCLOSURE

Processes for polymerizing alpha olefinic hydrocarbons comprising polymerizing an alpha olefin with a solid stereospecific catalyst in the presence of a diluent which is a solvent for the poly-alpha-olefin at the reaction temperature to produce a polymer solution containing catalyst residues. The polymer solution is filtered to remove catalyst residues. The filtered solution is contacted with alumina and concentrated to form a solid polymer concentrate containing residual solvent. Pellets are formed of the polymer concentrate and the pellets extracted with a solvent for amorphous low molecular weight polymer to produce a highly crystalline polymer substantially free of impurities.

---

This application is a continuation-in-part application of Ser. No. 636,118, filed May 4, 1967 and now abandoned.

This invention relates to a process for the preparation of solid olefinic hydrocarbon polymers. More particularly, this invention relates to a process for the preparation of substantially ash free, non-corrosive solid polymers prepared by solution polymerization of olefins employing high temperature stereospecific lithium containing catalysts, which polymers have excellent color.

In recent years solid, high molecular weight polymers which are partially or substantially crystalline have been prepared from olefinic hydrocarbons such as ethylene and propylene by low pressure polymerization of the monomer in the presence of solid stereospecific polymerization catalysts. Such polymers have been used extensively in a number of different applications including, for example, fibers, molding and coating applications. These polymers are, however, deficient for many uses because they contain metal contaminants (ash) caused primarily by the catalyst systems used in their preparation. It is particularly difficult to obtain polymers free of catalyst residues because they are present in the polymerization partly in dissolved form, partly as solid particles and partly in a form completely enclosed by the polymer. The quantities of ash present in the aforementioned polymers vary from about 0.3 to about 0.5 weight percent and cause the polymer to discolor badly during processing. Such ash may also unfavorably affect the electrical properties of the polymer. In addition, these relatively high ash contents cause the polymer to exhibit some degree of instability and may corrode materials commonly used in processing apparatus. Polymers having ash contents as high as .05 weight percent have been found to be satisfactory for some commercial applications, but for many other applications these polymers should be substantially free of ash, i.e., exhibit ash contents of .01 weight percent or less. Thus, the tendency of polymers to darken or degrade upon being shaped, molded or otherwise formed into fibers, film or other structures, particularly when exposed to heat or upon exposure to light, is, for all practical purposes, eliminated when the ash content of the polymer is .01 weight percent or less. It is obvious, therefore, that a simple, direct and commercially feasible process for preparing high molecular weight polymers of olefinic hydrocarbons substantially free of ash, i.e. exhibiting ash contents of less than .01 weight percent, would substantially enhance the art.

A number of methods have been proposed for effecting the removal of catalyst residues from the polymers resulting from the polymerization of olefins from solid stereospecific catalysts. These methods include: alcoholysis of the polymers to solublize the catalyst residues; treatment of the polymer with a chelating agent, e.g. acetylacetone; extracting the solidified polymer with an alcohol-chelating agent combination; treatment of the polymer with aqueous hydrated silica; addition of a fatty acid to the polymer to solubilize the catalyst residues; and addition of alcohol to a solution of the polymer in a hydrocarbon solvent.

Although the foregoing methods can be used to remove the catalyst residues from the polymer, there are certain attendant disadvantages in the employment of these methods. For example, all of the above methods require the use of functional compounds, i.e., alcohols, chelating agents, fatty acids, water, which compounds are poisonous to the catalysts employed in the polymerization process. Therefore, either separate process streams for polymerization and purification or extensive separation facilities for the single process stream is required to isolate these catalyst poisons from the reaction zones. However, both of these alternatives are commercially undesirable. Furthermore, corrosive substances are formed when the functional compounds react with the catalyst residues, so that expensive materials must be used in the fabrication of the process equipment in order to withstand the corrosive attack.

Accordingly, it is an object of this invention to provide a process for the preparation of polymers of olefinic hydrocarbons which are substantially free from inorganic residual constituents of the catalysts used in their preparation.

Another object of this invention is to provide a process for the preparation of substantially ash free, non-corrosive, solid polymers of olefinic hydrocarbons having excellent color.

Another object of this invention is to provide a simple, direct and commercially feasible process for the preparation of solid, high molecular weight polymers of olefinic hydrocarbons which are substantially free of ash and non-corrosive.

Still another object of this invention is to provide a solid olefinic hydrocarbon polymer, such as polypropylene, which has been prepared with a stereospecific catalyst in a solution process which polymer has excellent color and stability.

Still another object of this inveniton is to provide a process for the preparation of crystalline alpha-olefinic hydrocarbon polymers at high temperatures which exhibit substantially no ash content.

Other objects of this invention will be apparent from an examination of the description and claims which follow.

In accordance with this invention, it has been found that polymers of olefinic hydrocarbons prepared in solution at high temperatures can be substantially freed from residual constituents of the stereospecific catalysts used in their preparation by a process which, briefly, comprises dilution of the resulting polymer solution with additional polymerization solvent followed by filtration of the polymer solution to remove the major portion of catalyst residues. The solution is then treated with adsorbent alumina, concentrated to the desired level, pelleted, and extracted with a solvent to yield a highly crystalline polymer. The treatment of the polymer solution with alumina is unexpectedly advantageous for removing any remaining catalyst residues and impurities when high temperature stereospecific catalysts are employed, without the necessity of adding a functional compound of the type described above.

The process of this invention yields linear, highly crystalline, low ash content polymers and copolymers, which are non-corrosive and have excellent color and stability.

The olefinic hydrocarbon polymers that are employed in the practice of this invention include the highly crystalline solid polymers prepared from alpha-monoolefinic hydrocarbons, desirably containing 2–20 carbon atoms, such as for example ethylene, propylene, butene-1, 4-methylpentene-1, 3-methylbutene-1, hexene-1, heptene-1, decene-1 and the like.

In addition to the foregoing homopolymers, the practice of this invention also includes the preparation and treatment of polyallomers such as for examples propylene/ethylene polyallomer, 4-methyl-pentene-1/butene-1 polyallomer propylene/butene-1 polyallomer, ethylene/hexene-1 polyallomer and propylene/alpha-monoolefinic hydrocarbon polyallomer. Polyallomers are defined as crystalline, block polymers, that are synthesized with two or more olefins, in which the individual segments exhibit degrees of crystallinity normally associated only with alpha-olefin homopolymers.

The high temperature stereospecific polymerization and copolymerization of ethylene, propylene, butene-1, and higher alpha olefins in solution to form predominantly crystalline polymers can be effected with lithium containing catalysts such as lithium metal, lithium aluminum hydride, and other complex hydrides of lithium such as for example as lithium dialuminum heptahydride, lithium borohydride and complex reaction products containing lithium such as the product obtained by reacting lithium hydride or lithium alkyl with an aluminum alkyl or alkyl aluminum hydride, or mixtures of these in combination with a Group IV–B to VI–B transition element halide at a valence state of one less than maximum. Third components such as NaF, and MgO may also be used. Such preferred high temperature stereospecific catalysts for the polymerization of propylene and higher alpha-olefins are for example lithium aluminum hydride in combination with titanium trichloride, and sodium fluoride; lithium dialuminum heptahydride in combination with titanium trichloride, sodium fluoride and magnesium oxide; and complex lithium containing compounds such as the product obtained by reacting lithium hydride or lithium alkyl with an aluminum alkyl or alkyl aluminum hydride in combination with titanium trichloride.

As previously mentioned, it has been unexpectedly discovered that by contacting the polymer produced by high temperature lithium containing catalysts in solution with alumina, subsequent to the dilution and filtration steps of this invention, residues of these catalysts and impurities may be removed without employing a functional compound that reacts with the catalyst residue, e.g. an alcohol or chelating agent. This results in a non-corrosive polymer product with excellent color and stability.

The components of the catalyst may be mixed in varying proportions depending on the desired molecular weight and stereospecificity of the polymer product, and on the nature of the cocatalyst. For example, $LiAlH_4$ and $TiCl_3$ are useful in molar ratios of from about 0.2 to about 1.5/1, whereas lithium metal dispersions and $TiCl_3$ ordinarily require molar ratios of at least about 5/1.

The conditions employed in the present solution polymerization process may be varied over a wide range. For example, the reaction temperatures employed may be in the range of between about 120° and about 300° C. and preferably between about 140° and about 250° C. The pressures used in the polymerization reaction may be in the range of between about atmospheric and about 2000 atmospheres, preferably from about 10 to about 200 atmospheres.

The polymerization reaction is carried out in the presence of an inert organic liquid vehicle which is a solvent for the polymer being produced at the polymerization temperature. Thus, the organic vehicle employed may be an aliphatic alkane or cycloalkane such as pentane, hexane, heptane or cyclohexane, or a high molecular weight liquid paraffin or mixture of paraffins which are liquid at the reaction temperature, or an aromatic hydrocarbon such as benzene, toluene, xylene or the like. A petroleum fraction of suitable boiling range such as odorless mineral spirits (a sulfuric acid washed paraffinic hydrocarbon boiling at 180°–200° C.) will give particularly good results. In addition, good results can be obtained when the polymerization is carried out in the presence of a dense gas such as highly compressed ethylene and/or propylene by operating at elevated pressures. In order to obtain the maximum polymer to catalyst yields, the percent polymer in the reactors is generally held in the range of between about 20 and about 40 percent by weight, and more preferably, between about 30 and about 40 percent by weight. In the case of polypropylene having an inherent viscosity of from about 1.5 to about 2.5, the preferred amount of solids is in the range of between about 30 to about 40 percent by weight.

The inherent viscosity of the polymer may be controlled by various means including the catalyst component ratio, the reaction temperature, the monomer concentration, and/or by the addition of up to about 1000 p.p.m. of hydrogen. The most convenient method of controlling the molecular weight of the polymer is by varying the reaction temperature.

The invention will be further illustrated by reference to the accompanying drawing.

Referring to FIG. 1 of the drawing, the monomer charge stock, such as propylene, is passed through a line 11 along with a stereospecific polymerization catalyst, such as $LiAlH_4$-$TiCl_3$-NaF, which is introduced through a line 12, and an inert hydrocarbon solvent, such as mineral spirits, which is introduced through a line 13, to a polymerization reactor section 14, which may comprise one or more polymerization reactors. The resulting polymer solution is discharged from the reactor section 14 through line 15 to a let-down tank 16 where unreacted monomer is flashed and recycled to the monomer feed line 11 by means of a line 17, where it joins fresh monomer feed, which is being introduced through the line 11. In a preferred method of operation the unreacted monomer is recovered and purified as by distillation prior to recycling to the monomer feed line 11.

In one method of operation a dilution solvent is added to tank 16 by means of a line 18 to lower the viscosity of the polymer solution so as to permit the subsequent filtration to proceed more satisfactorily. Polymer concentrations in the range of from about 5 to about 15 percent by weight and temperatures in the range of from about 150° to about 250° C. yield low viscosities which do not require pressure drops through the filters in excess of 100 p.s.i. for efficient operation of the filter. The dilution solvent which is added through the line 17 may be the same or different as the solvent employed in the reaction section 13. Additionally, a filter aid, such as finely-divided asbestos, diatomaceous earth or kieselguhr is added to the dilution tank 16 by means of a line 19 in amounts based upon the weight of catalyst. Suitable ratios of filter aid to catalyst include a ratio as high as about 10 to 1. However, ratios of from about 2 to 1 to about 4 to 1 are preferred.

The diluted polymer solution, which contains divided filter aid, e.g. an average particle size of about 5 to 60 microns, is transferred from the let-down tank 16 to the filter 21 by means of the line 20 to separate the catalyst from the polymer solution. Suitable filters include the screen type filters, which may be precoated with asbestos and other filter aids. Plate and frame filters with paper cloth or glass matte dressings, rotary drum filters and pressure leaf filters are highly suitable for the purposes of this invention. The filtration temperatures that are employed are those which maintain the polymer in solution. Suitable temperatures include those in the range between about 150° C. and about 250° C. For the most efficient filtration, the pressure drop across the filter 21 is held to a pressure level below about 50 p.s.i. Filtration may be preceded by some other non-chemical catalyst separation technique (not shown in the drawing), such as centrifugation, electrostatic precipitation, or cyclone separation. While these other physical methods permit the recycle of at least a portion of the active catalyst to the reactor, a filter must be employed to obtain the ultimate separation. A second back-up or polishing filter (not shown) may be used in addition to the primary filter 21, which filter may likewise be dressed with special process-resistant materials.

The filtered polymer solution is sent from the filter 21 by way of the line 22 through the valve 26 and a line 23 into the adsorption section 24 for the removal of the remaining catalyst residues and impurities.

Adsorption section 24 contains alumina, which is employed in the form of either a fixed or a moving bed, or in such other means as is conventional in the adsorption art. Various sizes of alumina may be employed in the process, however, since the efficiency of adsorption increases as the surface area of the adsorbent employed is increased, a smaller particle size may be preferred depending on the type of contact used. Suitable sizes of alumina include from about 4 to about 14 mesh alumina. The contact time for adsorption on the alumina may be varied over a wide range, but preferably the adsorption is conducted in a very short time. Thus, in a fixed bed type of operation contact times of as little as 10 seconds are satisfactory. Likewise, the temperatures and pressures utilized in the alumina adsorption operation may be varied over a broad range. Suitable temperatures include those in the range between about 150° and about 250° C., while suitable pressures include those in the range between about 50 and about 300 p.s.i.g.

In a preferred method of operation a guard filter 24A is included as part of the adsorption section to remove any alumina fines or particles which may flake off from the bed. Ful-flo filters with glass-wound elements having a micron retention rating of about 30 are very satisfactory for this service.

The treated polymer solution by way of valve 27 and line 28, is introduced into the concentrator unit 29. While recovery of the polymer from the treated polymer solution may be accomplished several ways, the preferred method is melt concentration. In this method the treated polymer solution is fed to a suitable heat transfer device, where the solvent is flashed off leaving a polymer melt containing less than 30 percent solvent which will form a solid, continuous phase in the ambient temperature range. Continuous concentration of the polymer melt may be carried out in Rodney-Hunt and Votator evaporators, in Holoflite exchangers, in tubular exchangers with a countercurrent gas flow to sweep out solvent, and by passing gas through a column of the polymer solution.

In the preferred operation of the process, stripping of the solvent from the treated polymer solution introduced into concentrator 29 is facilitated by sweeping the system with a hot gas such as ethane, nitrogen or a monomer, e.g. in the production of polypropylene with propylene monomer, which gas is introduced by means of the line 30 into the concentrator 29. The solvent and stripping gas are removed from the concentrator by means of the line 31 and are passed to a stripping gas system 32 where the solvent is condensed from the stripping gas and sent to a solvent purification system (not shown). The purified solvent may then be recycled by means of the line 33 which joins the line 59 and then to the let-down tank 16 by way of the lines 59a and 18 and/or to the reaction section 14 by way of the lines 59b and 13.

The rate of stripping and the viscosity of the melt in the concentrator 29 is controlled by the temperature therein. Suitable temperatures for concentration of the polymer solution are in the range of from about 150° to about 250° C. Higher temperatures may lead to thermal degradation of the polymer. The viscosity of the melt is maintained at an acceptable level by leaving about 30 percent or less of the solvent in the melt. By retaining this amount of residual solvent with the polymer, a melt results which flows with comparative ease and may be easily extruded and pelleted. Additionally, amorphous polymers are more easily extracted from pellets containing between about 5 and about 30 percent residual solvent than from solvent-free pellets.

The concentrated polymer melt is discharged from the concentrator 29 by means of line 34 and conducted by means of the extrusion pump 35 to the die 37, e.g. a four-hole die having a diameter of about ⅛ inch by way of the line 36. The extruded polymer melt is passed through the water trough 38 in the form of a rod and is air dried and then passed to a cutter 39, where the rod is chopped into pellets having a diameter of ⅛ inch and a length of ³⁄₃₂ inch. The pellets are then contacted with an inert gas, such as nitrogen from the inert gas transfer system 40 in the line 41 and are gasveyed through valve 42 to a feed hopper 43. The inert gas is passed by means of a line 44 to the inert gas transfer system 40 for contact with additional pellets.

The pellets are passed from the feed hopper 43 by means of a line 45 through the valves 46 and 47 to the extractor 48, where the pellets are contacted with an extraction liquid, which is fed to the extractor by way of the line 49. The extraction may be conducted with any suitable solvent capable of removing amorphous polymers.

The choice of an extraction solvent and extraction temperature is generally governed by the composition of the polymer or copolymer to be treated. In the processing of propylene polymers and block polymers which are predominately propylene, the extraction is preferably carried out with hexane or heptane at temperatures in the range of between about 30° and about 90° C. The volume of extracting liquid per volume of pellets will vary as a function of time in the extractor, the percent residual reaction solvent, extraction temperature and the depth of extraction desired. However, suitable weight ratios of solvent to polymer may be varied widely and include those in the order of between about 0.5 to 1 and 50 to 1.

The extracted pellets are discharged from the extractor 48 and passed by means of a line 50 through a valve 51 to the drier 52 where the residual extraction liquid is removed from the wet pellets by any conventional drying operation such as by vacuum drying or more preferably by stripping with an inert gas, such as nitrogen, methane, propane, etc. The inert gas and residual solvent are passed from the drier by means of a line 53 to an inert drying gas system 54, where the extraction liquid is physically separated from the inert gas, e.g. condensation or adsorption, and passed by way of a line 55 to the line 49 for recycle to the extractor. The crystalline polymer product is discharged from the drier 52 by way of the valve 56 and line 57, while the amorphous polymer and solvent are removed from extractor 48 by way of the line 58 and are sent to a recovery system 60 for the removal of the solvent from the higher boiling material.

The recovery system 60 may include any suitable means for recovering purified solvent, so that it may be further used in the system. Thus, the recovery system may include fractionating columns, adsorption towers, e.g., silica gel and molecular sieve towers, etc., for use in purifying the solvent, e.g. mineral spirits. The purified solvent is recycled through the line 59 to the let-down tank 16 by means of lines 59a and 18, and/or to the reactor section 14 by means of the lines 59b and 13. the amorphous polymer is recovered from the line 60. This substantially colorless amorphous polymer is essentially free of catalyst residues and other impurities.

Some of the unexpected advantages realized by incorporating an alumina adsorption step into the process described above are that the recovered cyrstalline polymer in addition to being essentially colorless and ash-free, has improved physical properties such as improved tensile strength, stiffness and hardness. Also chlorides and other impurities, a major cause of stress corrosion, are essentially eliminated from the process stream thereby eliminating the necessity for using expensive equipment such as glass-lined extractors. Moreover, further treatment of the crystalline polymer with chelating agents and alcohols to remove catalyst residues are eliminated thereby preventing the contamination of the recycle solvent with catalyst poisons. Also another advantage is that there is an increase in production rate since a polymer of a specific I.V. can be produced at higher reactor temperatures. Also, a further advantage is that higher viscosity solutions can be passed through larger size filters to remove the major portion of large-sized solid catalyst residues since the alumina bed removes the remaining smaller-size solid catalyst residues. Another advantage is that since the alumina bed can remove substantially all catalyst residues in the event of a filter breakdown, the alumina bed prevents contamination of the polymer with catalyst residues which pass through the filter. A further advantage of our invention is that amorphous polymer recovered from the gross polymer is also substantially ash free and colorless.

Another unexpected advantage realized by incorporating an alumina adsorption step into the process of the present invention is that more concentrated polymer solutions can be filtered, catalyst residues removed by adsorption on alumina and polymers with the same ultimate freedom from ash and color obtained. In prior art filter operations it has been necessary to employ filter aids with particle micron retention ratings of three or less, and precoat asbestos with a micron retention of 0.5 in order to obtain acceptable ash removal from the polymer. In the process of this invention, employing a precoat filter followed by an alumina adsorption step filter aids with micron retention ratings of about five and precoat asbestos with micron retention ratings of about 1 to 1.5 have been found satisfactory. The coarser grades of filter aid and asbestos allow filtration of polymer solutions with about 10–20 times higher viscosities and with substantially no increase in pressure drop. In practice we have also found that about twice as much polymer can be processed for a given filter area before the filter must be cleaned. The economic advantages of the above discoveries are extremely important in the highly competitive polyolefin field. The quantity of solvent which must be processed and purified is reduced from about 10–15 pounds per pound of polymer to about 2–4 pounds per pound of polymer. The filter area required to process a given rate of polymer production is reduced to at least about 50 percent of that formerly required. The longer on-stream life of the filters also results in savings in operating and maintenance costs.

This invention can be further illustrated by the following examples of preferred embodiments thereof although it will be understood that these examples are included merely for purposes of illustration and are not intended to limit the scope of the invention unless otherwise specifically indicated. The percentages given in the examples are by weight unless otherwise specified.

EXAMPLE 1

Polypropylene is prepared in a continuous stirred reactor by feeding propylene, mineral spirits, and catalyst slurry into the reactor. The catalyst slurry is a suspension in mineral spirits of lithium aluminum hydride, titanium trichloride, sodium fluoride, and magnesium oxide in a mole ratio of 0.8/1.0/0.5/0.1. The reactor is maintained at a temperature of 150° C. and a pressure of 1000 p.s.i.g. The feed rates are adjusted so that a 20 percent by weight polymer solution is obtained. The reactor discharge passes through a pressure let-down system into a let-down tank where unreacted propylene is flashed off and fresh mineral spirits is added to yield an 8 percent by weight polymer solution. From the dilution tank the polymer solution is heated to 230° C. and passed through a precoated pressure leaf filter to remove the major portion of the catalyst residues.

After filtration the polymer solution is passed through a 10 foot long, 2-inch diameter column, containing 4 to 8 mesh alumina (Alcoa F–3). The column is maintained at a pressure of 250 p.s.i.g. and 225° C. Solvent is removed from the polymer by stripping with hot propylene. The polymer melt is extruded into pellets followed by hexane extraction and drying. The color, chloride conent and ash content of the resulting polypropylene is compared in Table I with a sample taken prior to the alumina treatment and worked up in the same manner.

TABLE I

[Crystalline polypropylene having an I.V. of 1.8 (.25 grams per 100 ml. tetralin measured at 145° C.), melt flow of 2.3 determined at 230° C. and 2,160 grams load (ASTM D–1238) and a Vicat softening point of 145° C. (ASTM D–1525)]

|  | Prior to alumina treatment | After alumina treatment |
| --- | --- | --- |
| Ash, percent | 0.060 | 0.001 |
| Color | 365 | 37 |
| Chlorides (p.p.m.) | 132 | 6 |
| Tensile strength (p.s.i.) | ¹ 4,630 | 5,070 |
| Stiffness | ² 141,000 | 165,000 |
| Hardness | ³ 89 | 95 |

¹ (ASTM D–638).
² (ASTM D–747).
³ (ASTM D–785).

EXAMPLE 2

A propylene-ethylene polyallomer is prepared in a continuous two-stage reactor system equipped with stirrers. In the first reactor the feed is mineral spirits, propylene, and catalyst. The catalyst is lithium dialuminum heptahydride, titanium trichloride, and sodium fluoride in a mole ratio of 0.2/1.0/0.5. The first reactor is maintained at 155° C. and 1000 p.s.i.g. and the feed rates are adjusted to give a 25 percent by weight polymer solution. The effluent from the first reactor is fed to the second reactor which is maintained at 160° C. and 1000 p.s.i.g. Ethylene gas is fed to the second reactor at a rate such that 1 percent ethylene is incorporated in the polymer.

The discharge from the second reactor passes through a pressure let-down system into a dilution tank where fresh mineral spirits is added to yield a 10 percent polymer solution. From the dilution tank the polymer solution is filtered and passed through a 2 inch diameter, 10 foot long column containing ¼ inch pellets of alumina (Harshaw AL–0104). The column is maintained at 300 p.s.i.g. and 222° C.

The solvent is removed from the polyallomer by stripping with hot propylene followed by hexane extraction and drying. The color, chloride content, and ash content of the resulting propylene-ethylene polyallomer is compared in Table II with a sample of the same material taken prior to the alumina treatment and worked up in the same manner.

TABLE II

[Propylene-ethylene polyallomer having an I.V. of 1.8, a melt flow of 2.2, and an Vicat softening point of 103° C.]

|  | Prior to alumina treatment | After alumina treatment |
| --- | --- | --- |
| Ash, percent | 0.051 | 0.000 |
| Color | 425 | <20 |
| Chlorides (p.p.m.) | 148 | 5 |
| Tensile strength (p.s.i.) | 3,700 | 4,000 |
| Stiffness | 95,000 | 115,000 |
| Hardness | 73 | 80 |

EXAMPLE 3

Polypropylene is prepared in a continuous stirred reactor by feeding propylene, mineral spirits, and catalyst into the reactor. The catalyst is lithium aluminum hydride, titanium trichloride, and sodium fluoride in a mole ratio of 0.1/1.0/0.5. The reactor is maintained at 160° C. and 1000 p.s.i.g. The feed rates are adjusted so that a 30 percent by weight polymer solution is obtained. The reactor discharge is let down into a dilution tank where fresh mineral spirits is added to yield a 12 percent polymer solution. The polymer solution is filtered and passed through a 4.5 foot diameter, 8 foot long column containing 8 to 14 mesh alumina. The column is maintained at 190° C. and 100 p.s.i.g.

Samples of polymer solution are taken before and after the treatment with alumina. After separation from the solvent, the resulting polypropylenes are compared with regard to color, chloride content and ash content as shown in Table III.

TABLE III

[Polypropylene having an I.V. of 1.4, a melt flow of 8.5, and a Vicat softening point of 143° C.]

| | Prior to alumina treatment | After alumina treatment |
|---|---|---|
| Ash, percent | 0.083 | .001 |
| Color | 408 | 43 |
| Chlorides (p.p.m.) | 240 | 6 |
| Tensile strength (p.s.i.) | 4,700 | 5,100 |
| Stiffness | 135,000 | 160,000 |
| Hardness | 90 | 94 |

EXAMPLE 4

Example 4 was repeated except that catalyst employed was lithium aluminum hydride and titanium trichloride in a mole ratio of 0.6/1.0. Results are shown in Table IV.

TABLE IV

Polypropylene having an I.V. of 1.2, a melt flow of 17, and a Vicat softening point of 142° C.]

| | Prior to alumina treatment | After alumina treatment |
|---|---|---|
| Ash, percent | 0.033 | 0.000 |
| Color | 460 | 40 |
| Chlorides (p.p.m.) | 69 | 2 |
| Tensile strength | 4,500 | 4,950 |
| Stiffness | 133,000 | 159,000 |
| Hardness | 88 | 92 |

EXAMPLE 5

Example 5 was repeated except the catalyst employed was lithium metal, lithium aluminum hydride and titanium trichloride in a mole ratio 2/0.5/1.0. Results are shown in Table V.

TABLE V

[Propylene-ethylene polyallomer having an I.V. of 1.2, a melt flow of 17, and a Vicat softening point of 142° C.]

| | Prior to alumina treatment | After alumina treatment |
|---|---|---|
| Ash, percent | 0.060 | .001 |
| Color | 365 | 48 |
| Chlorides (p.p.m.) | 132 | 5 |
| Tensile strength | 4,500 | 4,950 |
| Stiffness | 133,000 | 159,000 |
| Hardness | 88 | 92 |

EXAMPLE 6

Propylene-ethylene polyallomer is prepared by high temperature solution polymerization in a continuous three-reactor system. The synthesis section consists of three tubular reactors equipped with stirrers operating in series, each reactor having a volume of 800 gallons. Temperatures ranging from 140–165° C. and pressures ranging from 900–1500 p.s.i.g. are employed. Propylene mineral spirits and a catalyst consisting of lithium aluminum hydride, hydrogen-reduced $TiCl_3$ and sodium fluoride in a 0.8/1/0.5 mole ratio are fed to the first reactor. The effluent from the first reactor which is a solution under pressure containing about 25–35 percent polypropylene chains, 25–40 percent propylene monomer, mineral spirits and catalyst is led to the second reactor. Feed to the second reactor is propylene in the amount required to maintain propylene monomer at 25–40 percent, mineral spirits in the amount required to keep the polymer concentration below 35 percent, and ethylene in an amount which is in slight excess, 10–30 percent, of that desired in the final polyallomer. The effluent from the second reactor which contains 30–35 percent block copolymer chains in mineral spirits, propylene monomer, and negligible concentrations of ethylene is led to the third reactor. Propylene is fed to the third reactor to maintain a monomer concentration of 20–30 percent and mineral spirits is added at the rate required to maintain a polyallomer concentration in the third reactor effluent of 30–35 percent.

From the third reactor the polymer solution goes to the let-down tank where residual monomer is flashed for recycle. Celite 560 filter aid which has a 5 micron retention rating is added to the polymer solution in the ratio of 2/1 to the catalyst present. The polymer solution is then filtered through a precoat filter precoated with a 90/10 ratio of Celite 560 and Fibra Flo 747 asbestos. The filter effluent is passed through an alumina bed and the catalyst-free polymer solution is then concentrated to 70–80 percent and extruded into strands, cooled in a water bath and chopped into pellets. The pellets are extracted continuously with hexane at 68–69° C. and then dried.

The color, chloride content and percent ash of the propylene-ethylene block copolymer is compared in Table VI with sample of the same production taken prior to the alumina treat and worked up in the same manner.

TABLE VI

[Propylene-ethylene polyallomer having an I.V. of 1.8, a melt flow of 2.1, and a Vicat softening point of 126° C.]

| | Prior to alumina treatment | After alumina treatment |
|---|---|---|
| Ash, percent | 0.026 | 0.000 |
| Color | 395 | 30 |
| Chlorides (p.p.m.) | 112 | 6 |
| Tensile strength | 3,200 | 3,700 |
| Stiffness | 75,000 | 88,000 |
| Hardness | 56 | 63 |

EXAMPLE 7

Polypropylene is prepared in a continuous stirred reactor by feeding propylene, mineral spirits, and catalyst into the reactor. The catalyst is lithium dialuminum heptahydride, hydrogen-reduced titanium trichloride, and sodium fluoride in a mole ratio of 0.4/1.0/0.5. The reactor is maintained at 152–154° C. and 1000 p.s.i.g. The feed rates are adjusted so that a 28 percent by weight polymer solution is obtained. The reactor discharge is led to a let-down tank where unreacted propylene is removed for recycle to the polymerization reactor. Celite 560 filter aid is added in the ratio of 3 pounds of filter aid per pound of catalyst. The polymer solution is filtered and passed through a bed filled with 8 to 14 mesh alumina while maintaining a temperature of 200° C. The polymer solution was then concentrated, extruded into strands, chopped into pellets, and extracted as described in Example 9.

Samples of polymer solution were taken before the alumina bed and after the treatment with alumina. In Table VII the resulting polypropylenes are compared with regard to color, chloride content and ash content.

TABLE VII

[Polypropylene having an I.V. of 1.5, a melt flow of 4.5, and a Vicat softening point of 144° C.]

| | Prior to alumina treatment | After alumina treatment |
|---|---|---|
| Ash, percent | 0.052 | 0.000 |
| Color | 310 | 15 |
| Chlorides (p.p.m.) | 135 | 2 |
| Tensile strength | 4,600 | 5,000 |
| Stiffness | 145,000 | 163,000 |
| Hardness | 92 | 97 |

In the above examples the polymer was assigned a color based on CDM values. A color of 150 or less is equivalent to the best commercially available polypropylene. The chloride concentration of the polymers produced in the foregoing examples was determined by a burning procedure, which is outlined in the standard ASTM test D1266–62T, and was followed by titration on an Aminco-Cotlove chloride titrator.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A process for removing catalyst residues from poly-alpha-olefin obtained by polymerizing alpha-olefin containing 2–20 carbon atoms in the presence of solid stereospecific polymerization catalyst, which process consists of filtering a solution of said poly-alpha-olefin in a solvent for said poly-alpha-olefin at temperatures greater than 100° C. to remove the major portion of said catalyst residues and thereafter contacting said filtered polymer solution with alumina, to remove substantially all of the remaining minor portion of said catalyst residues.

2. The process for polymerizing an alpha olefinic hydrocarbon which consists of polymerizing at a temperature between about 120° and about 300° C. an alpha olefin containing from 2 to 0 carbon atoms with a solid stereospecific catalyst comprising lithium or lithium containing compounds in combination with a subvalent halide of a transition element in the presence of a diluent which is a solvent for the poly-alpha-olefin at the reaction temperature to produce a polymer solution containing catalyst residues, filtering the diluted polymer solution to remove the major portion of said catalyst residues, contacting said dilute solution with alumina to remove substantially all of the minor portion of said catalyst residues, concentrating the filter effluent to form a solid polymer concentrate containing residual solvent, forming pellets of the polymer concentrate, extracting the pellets of polymer concentrate with a solvent for amorphous low molecular weight polymer, and thereafter recovering a highly crystalline polymer substantially free of impurities.

3. The process of claim 2 wherein the polymerization is conducted at a temperature between about 140° and 300° C.

4. The process of claim 2 wherein the catalyst comprises a member selected from the group consisting of lithium metal, lithium aluminum hydride, lithium dialuminum heptahydride, lithium borohydride and complex reaction products containing lithium and mixtures thereof in combination wtih a subvalent halide selected from the group consisting of titanium, zirconium, chromium, tungsten, molybdenum and vanadium.

5. The process of claim 2 wherein filter aid is added to the polymer solution prior to said filtering.

6. The process of claim 2 wherein filter effluent is concentrated to between about 70 and about 95 percent by weight polymer.

7. The process for polymerizing an alpha olefinic hydrocarbon which consists of polymerizing at a temperature between about 120° and about 300° C. an alpha olefin containing from 2 to 20 carbon atoms in solution with a solid stereospecific catalyst comprising lithium or lithium containing compounds in combination with a subvalent halide of a transition element in the presence of a diluent which is a solvent for the polyolefin at temperatures greater than 100° C. to produce a polymer solution containing catalyst residues, filtering to remove the major portion of said catalyst residues, treating the filter effluent with an alumina adsorbent to remove substantially all of the minor portion of said catalyst residues, concentrating the effluent from the alumina treat to form a solid polymer concentrate, extruding the polymer concentrate, extracting the extruded polymer concentrate with a solvent capable of dissolving amorphous polymer, and thereafter recovering a highly crystalline polymer substantially free of impurities.

8. The process of claim 7 wherein the catalyst comprises a subvalent halide selected from the group consisting of titanium, zirconium, chromium, tungsten, molybdenum and vanadium in combination with a number selected from the group consisting of lithium metal, lithium aluminum hydride, lithium dialuminum heptahydride, lithium borohydride and complex reaction products containing lithium and mixtures thereof.

9. The process of claim 8 wherein the polymer has an inherent viscosity in the range of about 0.5 to about 2.5.

10. The process of claim 8 wherein the filtration is carried out with filter-aid having a micron retention rating of greater than about three.

11. The process for polymerizing block copolymers in solution which consists of alternately polymerizing at a temperature between about 120° and about 300° C. an alpha olefin containing from 2 to 20 carbon atoms in solution with a solid stereospecific catalyst comprising lithium or lithium containing compounds in combination with a subvalent halide of a transition element in the presence of a diluent which is a solvent for the polymer formed at a temperature above about 120° C. to obtain a preformed polymer chain and then polymerizing another alpha olefin containing from 2 to 20 carbon atoms or a mixture of the first alpha olefin with another olefin to form a block copolymer, filtering the polymer to remove the major portion of said catalyst residues, treating the filter effluent with an alumina adsorbent to remove substantially all of the minor portion of said catalyst residues, concentrating the effluent from the alumina treat, extruding the polymer concentrate, extracting the extruded polymer with a solvent capable of dissolving amorphous polymer, and thereafter recovering a block copolymer substantially free of impurities.

References Cited

UNITED STATES PATENTS

| | | | |
|---|---|---|---|
| 2,890,214 | 6/1959 | Brightbill et al. | 260—94.9 |
| 3,001,977 | 9/1961 | Wisseroth et al. | 260—93.7 |
| 3,164,578 | 1/1965 | Baker et al. | 260—94.9 |
| 3,255,166 | 6/1966 | Bernhardt et al. | 260—88.2 |
| 3,281,399 | 10/1966 | Renaudo et al. | 260—88.2 |
| 3,398,129 | 8/1968 | Leibson et al. | 260—93.7 |
| 3,423,384 | 1/1969 | Hagemeyer et al. | 260—93.7 |

JOSEPH L. SCHOFER, Primary Examiner
S. M. LEVIN, Assistant Examiner

U.S. Cl. X.R.

260—88.2S, 93.7, 94.9F

PO-1050
(5/69)

UNITED STATES PATENT OFFICE
CERTIFICATE OF CORRECTION

Patent No. 3,600,463      Dated August 17, 1971

Inventor(s) Hugh J. Hagemeyer; Jr., David C. Hull; Samuel J. Park

It is certified that error appears in the above-identified patent and that said Letters Patent are hereby corrected as shown below:

Column 8, line 12, "conent" should be ---content---.

Column 9, line 1, "0.1" should be ---0.8---.

Column 11, Claim 2, line 26, delete "0" and insert in lieu thereof ---20---.

Signed and sealed this 24th day of October 1972.

(SEAL)
Attest:

EDWARD M. FLETCHER, JR.
Attesting Officer

ROBERT GOTTSCHALK
Commissioner of Patents